Feb. 22, 1927.
H. H. HANTON
SAFETY DEVICE FOR SPARE TIRES
Filed March 11, 1926
1,618,924
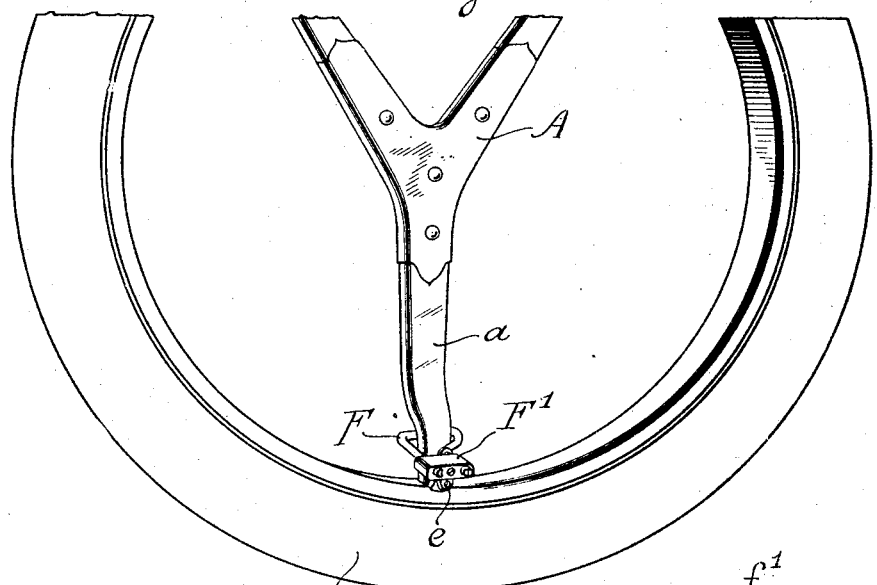
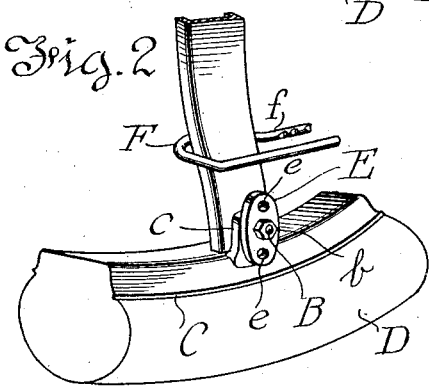
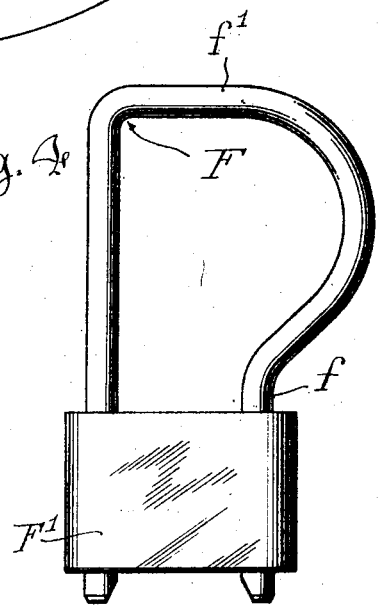
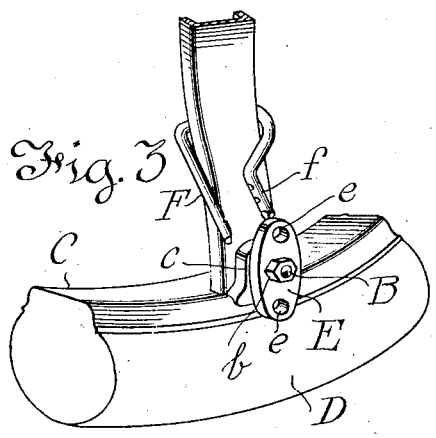
Inventor
Henry H. Hanton
By Sowell & Sowell
Attorneys Patented Feb. 22, 1927.

1,618,924

UNITED STATES PATENT OFFICE.

HENRY H. HANTON, OF LANCASTER, PENNSYLVANIA, ASSIGNOR TO FRAIM-SLAYMAKER HARDWARE CO., INC., OF LANCASTER, PENNSYLVANIA, A CORPORATION OF PENNSYLVANIA.

SAFETY DEVICE FOR SPARE TIRES.

Application filed March 11, 1926. Serial No. 94,090.

This invention relates to devices for securing tires to spare tire carriers so as to prevent them from being stolen, and more particularly to safety devices for spare tire carriers of the 1926 Ford car type.

The object of the invention is to provide a simple, efficient and inexpensive device of the character referred to for locking a spare tire to a spare tire carrier in such manner as to effectually secure the tire to the carrier so that it cannot be removed from the carrier by any one except the owner or his representative having a key with which to unlock a padlock forming a part of the safety device.

The invention will first be hereinafter more particularly described, with reference to the accompanying drawings, which are to be taken as a part of this specification, and then pointed out in the claims at the end of the description.

In said drawings, Fig. 1 is a perspective view on a reduced scale of a broken away portion of a spare tire carrier and tire with a rim having apertured lugs thereon, one of which is secured to one arm of the tri-armed carrier which is similar to the spare tire carrier used on the new 1926 Ford cars, the spare tire being secured on the carrier by an improved safety device embodying my invention; and Figs. 2 and 3 are perspective views of broken away portions of a spare tire carrier and a tire and rim with a lug secured to one arm of a tri-armed carrier and an apertured button-like device or cleat secured to the lug, together with a peculiarly formed shackle forming an element of the safety device arranged in different positions with respect to said arm and illustrating the mode of applying the shackle and inserting one of its limbs in a hole in the cleat; the two limbs of the shackle being adapted to be inserted in holes through a padlock case containing suitable mechanism for locking the limbs of the shackle within the case and thereby locking the tire to the carrier, so as to prevent the tire from being removed without unlocking the padlock, and Fig. 4 is a plan view of a padlock having a peculiarly formed shackle forming a part of my improved safety device.

Referring to said drawings, in which the same reference characters are used to denote corresponding parts in different views, the letter A denotes a portion of a spare tire carrier, which, in the form shown, is of the tri-armed type used on 1926 Ford cars; said carrier having an arm or frame-bar $a$ of greater width than thickness, so that it is substantially oblong form in cross-section and has its lower end abutting against the lower inner part of the rim of a tire mounted thereon; said arm being secured to an apertured lug $c$ on the rim by means of a bolt B having a nut $b$ screwed thereon. The upper portion of the tire rests upon suitable supports therefor, (not shown), and it is supported in position to be easily removed and replaced when the lower portion thereof, which underlies the lower end of the depending frame-bar $a$, is released, but in order to remove the tire it is necessary to release said lower portion and draw it out of engagement with the depending frame-bar $a$ of the carrier. On the bolt which secures the frame-bar $a$ to the lug $c$ is loosely fitted a suitably apertured button-like device or cleat E, and the assembled parts are held together by the bolt B and nut $b$, so that by removing the nut the cleat may be removed and thereupon the lower portion of a tire to be secured on the carrier may be shoved under the lower end of the frame-bar $a$, or a tire to be removed may be drawn toward the person desiring to remove the same from under the lower end of the frame-bar $a$, and the tire may then be lifted from its supports and removed. When the tire and rim are properly positioned on the carrier with the bolt B inserted through an aperture in the frame-bar $a$ and the registering aperture in the lug $c$, the cleat E being also fitted on the bolt and secured thereon by means of the nut $b$, the tire may be locked to the carrier by means of a padlock having a peculiarly formed shackle forming a part of my improved safety device, which comprises a combination of elements including in connection with a spare tire carrier of known form, having an arm or frame-bar of oblong form in cross section provided at its free end with means for attaching thereto a locking device, a padlock having a shackle of peculiar form with an enlarged head-portion adapted to embrace the frame-bar and straight end-portions adapted for insertion in parallel holes through a case of comparatively small size containing suitable locking mechanism for engagement with the limbs of the shackle so as to prevent it from being withdrawn without the intervention of a key or suitable means for disengaging the locking mechanism with the shackle arms. The shackle is of the peculiar form shown, having substantially parallel free end portions which are brought comparatively close together to permit the use of a small case containing the locking mechanism, while the head-portion is enlarged so that the distance between the upper portions of the two limbs is much greater than the distance between the free end portions thereof, thus adapting the shackle to be applied so as to embrace a frame-bar of greater width but less thickness than the distance between the parallel end portions of the shackle, with said end portions extending from said bar substantially at right angles to the longer sides thereof, as shown in Figs. 1 and 3 of the drawings; said end portions being adapted to straddle the frame-bar, when arranged parallel with said longer sides, as shown in Fig. 2, and moved into the position shown in Fig. 3, in which position the free end portion f of the shackle may be inserted in an aperture in the cleat E, while the enlarged head-portion of the shackle closely embraces the frame-bar, and thereupon the limbs of the shackle are inserted in the case F' and the latter shoved up tightly against the cleat, thereby drawing the straight end head-portion of the shackle tightly against the rear side of the frame-bar and forcing the case tightly against the button-like device or cleat E so as to firmly secure the assembled parts together with the enlarged head-portion of the shackle fitting closely around the frame-bar, so as to render it difficult for a thief to insert a jimmy or other tool between the head-portion of the shackle and the frame-bar for the purpose of breaking the lock and forcibly withdrawing the shackle from the case. The cleat, as shown, has an aperture in each end thereof and may be easily turned to bring the aperture at either end into position for inserting the end portion f of the shackle therein, and when the parts are properly assembled and secured together as described it is necessary to unlock and withdraw the shackle before the tire can be removed from the carrier.

By reason of the peculiar shape of the shackle, it is not only adapted to be applied to and to hug or fit closely around a frame-bar of oblong rectangular form in cross-section, and thus render it difficult to wrest it from its moorings by means of a tool of sufficient size and tensile strength, but it has the advantage of possessing great strength, while permitting the use therewith of a case of much smaller size than would ordinarily be required for a shackle of the same size and strength.

It will be understood of course that while my improved safety device is designed and adapted for use in securing tires to spare tire carriers, so as to serve not only as a means for preventing a tire from being stolen, but as a preventive means against the tire becoming loosened and jarred off the rack while the automobile is travelling over rough roads, it may be applied to various other uses.

Having thus described my invention, what I claim as new and desire to secure by Letters Patent of the United States is:

1. In combination with a spare tire carrier including a bar of oblong form in cross-section having an apertured end-portion, a tire having a metal rim provided with an apertured lug, and a fastening bolt inserted in the apertures in said bar and lug for securing them together, a padlock for securing said tire to said carrier, comprising a case having spaced holes therethrough and a shackle having an enlarged head portion and two limbs inserted in said holes; one of said limbs being straight and the other crooked; said crooked limb having a substantially straight free end-portion extending substantially parallel with the free end of said straight limb and curved outwardly from said free end-portion and then inwardly in a reverse curve and merging in a substantially straight head portion uniting the two limbs of the shackle substantially at right angles to said straight limb, whereby the shackle is adapted to straddle a bar of greater width but less thickness than the distance between the free end-portions of said limbs with said free end-portions extending substantially parallel with the flat sides of the bar and to be turned so that said limbs will extend substantially at right angles to said flat sides while the enlarged head portion of the shackle is caused to embrace said bar with its straight head portion fitting snugly against one of the flat sides of said bar substantially at right angles to its shorter sides or edges.

2. In combination with a spare tire carrier having a frame-bar of oblong form in cross section and a tire mounted thereon having a metal rim provided with apertured lugs, and means for securing said frame-bar to one of said lugs, a cleat detachably secured to said securing means, and a padlock for locking said tire to said carrier; said padlock comprising a case having parallel holes therethrough and locking mechanism therein and a shackle having an enlarged head-portion embracing said bar and two limbs inserted through the holes in said case; one of said limbs being straight its entire length and the other extending substantially parallel with said straight limb the greater part of its length and being then curved outwardly and then inwardly in a reverse curve and merging in a substantially straight head-portion uniting it with said straight limb substantially at right angles thereto; one limb of the shackle being inserted through an aperture in said cleat and the straight head-portion thereof fitting snugly against one of the longer sides of said bar substantially at right angles to the straight end-portions of the shackle, the latter extending substantially parallel with the two shorter sides of the bar.

3. In combination with a spare tire carrier and a tire mounted thereon having a metal rim provided with apertured lugs; said carrier having a frame-bar of oblong form in cross section with one end secured to one of said lugs, an apertured cleat pivotally secured to the last named lug, and a padlock comprising a case having parallel holes therethrough and locking mechanism therein and a shackle having an enlarged head-portion and two limbs inserted through the holes in said case; said enlarged head portion embracing said bar and one of said limbs being inserted through an aperture in said cleat; one of said limbs being straight its entire length and the other having its free end-portion extending substantially parallel with said straight limb the greater part of its length and being then curved outwardly and then inwardly in a reverse curve and merging in a substantially straight head-portion uniting it with said straight limb substantially at right angles thereto; one or both of said limbs having spaced notches therein, and means within said case for releasably engaging said notches and locking the shackle limbs within the case.

4. In combination with a spare tire carrier and a tire mounted thereon having a metal rim provided with an apertured lug; said carrier having a frame bar of oblong form in cross section with one end secured to said lug, an apertured cleat pivotally attached to said lug, and a padlock comprising a case having parallel holes therethrough and a shackle having two limbs inserted through said holes; said shackle having an enlarged head-portion embracing said frame-bar and having one of its limbs inserted through an aperture in said cleat; one of said limbs being straight its entire length and the other having its free end-portion extending substantially parallel with said straight limb the greater part of its length, and being then curved outwardly and then inwardly in a reverse curve and merging in a substantially straight head-portion uniting it with said straight limb substantially at right angles thereto; one of said limbs having spaced notches therein, and means within said case for releasably engaging said notches and locking the shackle to the case.

In testimony whereof I affix my signature.

HENRY H. HANTON.